United States Patent [19]
Shirk et al.

[11] Patent Number: 5,967,550
[45] Date of Patent: Oct. 19, 1999

[54] STAGED PYROTECHNIC AIR BAG INFLATOR

[75] Inventors: Bryan W. Shirk; Timothy A. Swann, both of Mesa, Ariz.

[73] Assignee: TRW Inc., Lyndhurst, Ohio

[21] Appl. No.: 08/946,152

[22] Filed: Oct. 7, 1997

[51] Int. Cl.⁶ ................................................ B60R 21/26
[52] U.S. Cl. ......................... 280/736; 280/741; 102/531
[58] Field of Search ................................. 280/736, 740, 280/741, 742; 102/530, 531

[56] References Cited

U.S. PATENT DOCUMENTS

| | | | |
|---|---|---|---|
| 3,711,115 | 1/1973 | Lohr | 280/736 |
| 3,778,084 | 12/1973 | Sutherland et al. | 280/741 |
| 3,972,545 | 8/1976 | Kirchoff et al. | 280/736 |
| 4,998,751 | 3/1991 | Paxton et al. | 280/740 |
| 5,397,543 | 3/1995 | Anderson | 280/742 |
| 5,507,890 | 4/1996 | Swann et al. | |
| 5,529,335 | 6/1996 | Bohmler. | |

*Primary Examiner*—Peter C. English
*Attorney, Agent, or Firm*—Tarolli, Sundheim, Covell, Tummino & Szabo

[57] ABSTRACT

An inflator (10) includes a housing (30) defining a chamber (50). An end-burning pyrotechnic charge (60) is in the chamber (50) in the housing (30) for, upon ignition, producing inflation fluid for inflating an inflatable device. The charge (60) has a first predetermined burn rate at a first location along the length of the chamber (50) and a second predetermined burn rate at a second location along the length of the chamber spaced apart from the first location. The second predetermined burn rate is different from the first predetermined burn rate. The inflator (10) includes an initiator (112) for igniting the charge (60), and portions (34, 90, 110) for directing inflation fluid from the chamber (50) to the inflatable device.

13 Claims, 4 Drawing Sheets

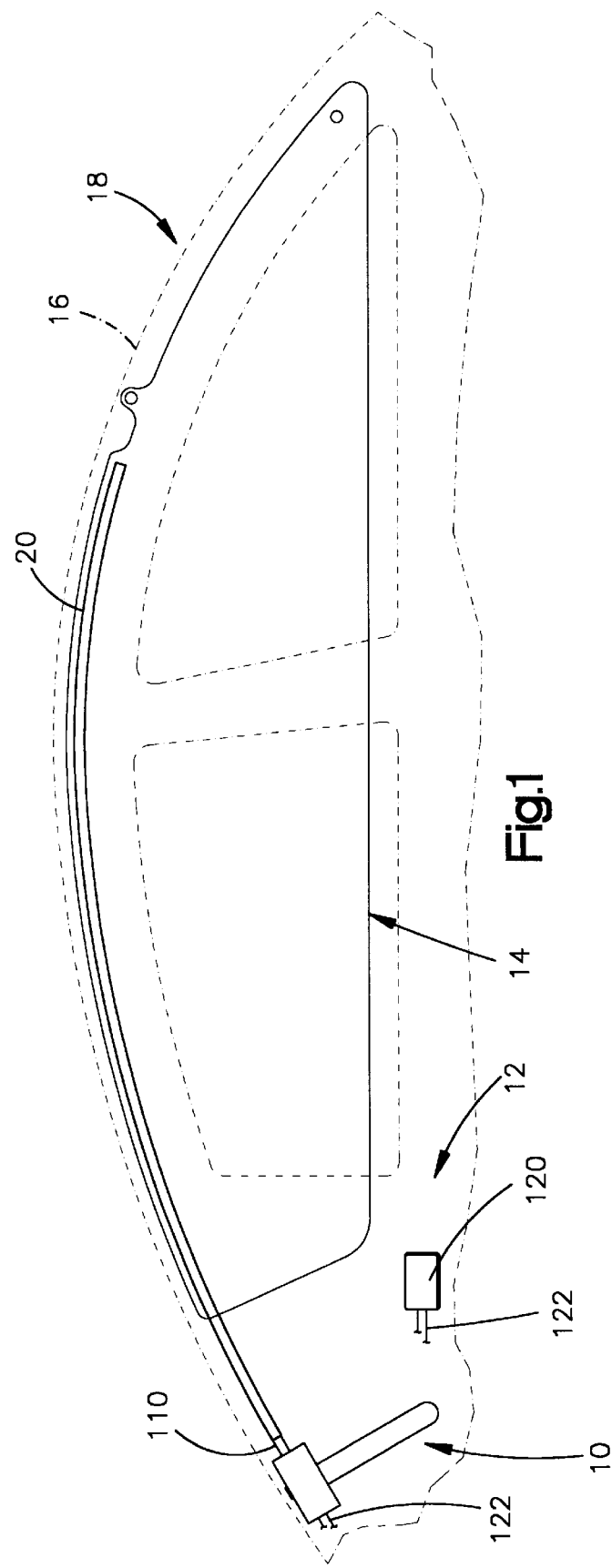

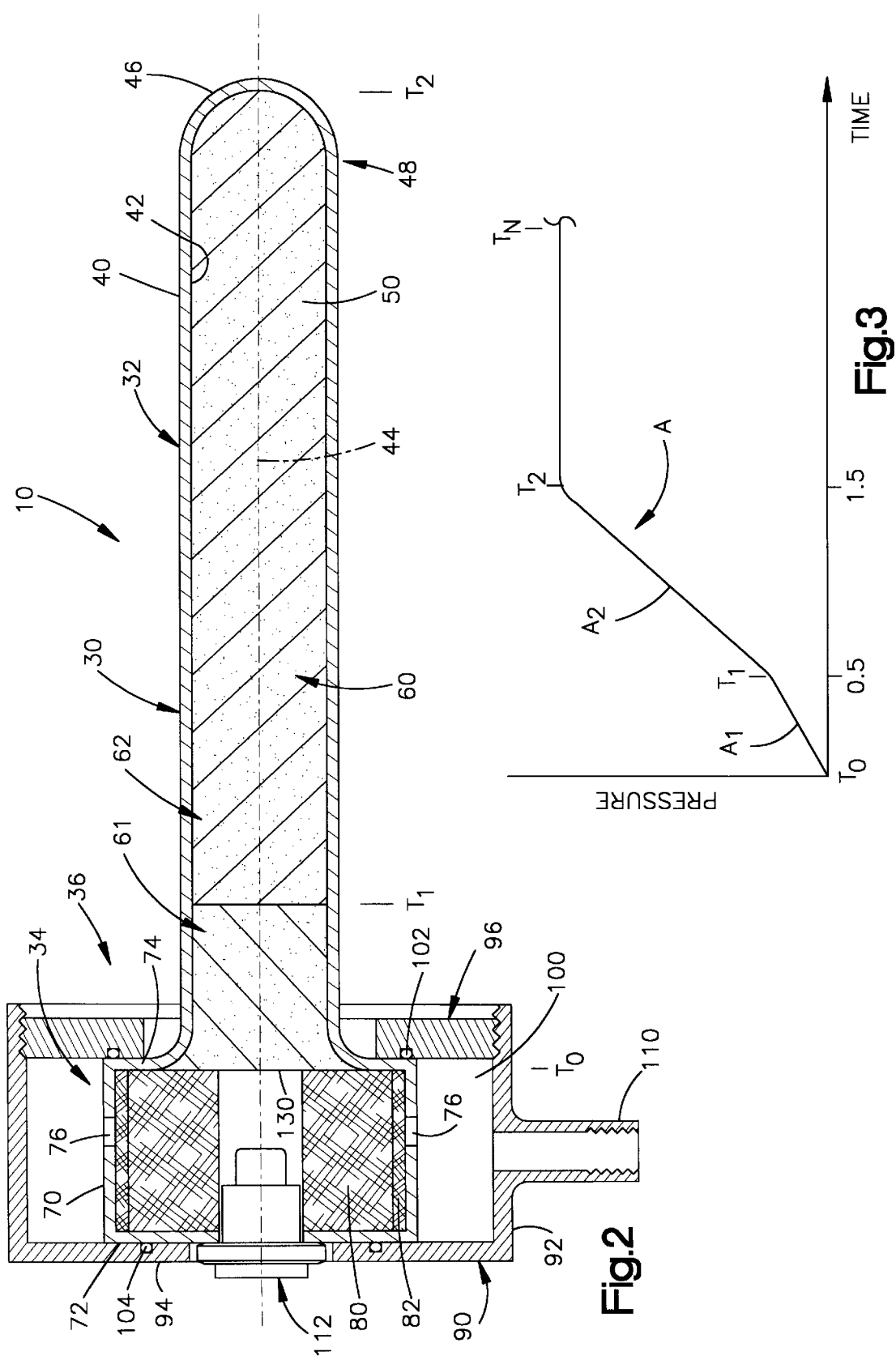

STAGED PYROTECHNIC AIR BAG INFLATOR

BACKGROUND OF THE INVENTION

1. Technical Field

The present invention relates to a vehicle safety apparatus and, in particular, to an inflator for an inflatable vehicle occupant protection device, such as an air bag.

2. Description of the Prior Art

It is known to inflate a vehicle occupant protection device, such as an air bag, to help protect a vehicle occupant. The air bag is inflated by inflation fluid from an inflator. One common type of inflator uses a pyrotechnic material which, when ignited, generates inflation fluid in the form of gas under pressure to inflate the air bag. The air bag is inflated into a position between the vehicle occupant and a portion of the vehicle to help protect the vehicle occupant in the event of a vehicle collision or of an impact to the vehicle.

It is known to tailor the output pressure of the inflator, in order to inflate an air bag in a predetermined manner over a period of time. For example, it is known to begin inflating an air bag at first with inflation fluid at a relatively low pressure, then finish inflating the air bag with inflation fluid at a relatively high pressure. Some known inflators of this type have two actuatable pyrotechnic charges and a separate initiator for each stage. In such an inflator, vehicle electric circuitry separately controls actuation of the two stages of the inflator in response to one or more sensed conditions.

SUMMARY OF THE INVENTION

The present invention is an apparatus for inflating an inflatable vehicle occupant protection device. The apparatus comprises a housing defining a chamber, and an end-burning pyrotechnic charge in the chamber in the housing for, upon ignition, producing inflation fluid for inflating the inflatable device. The charge has a first predetermined burn rate at a first location along the length of said chamber and a second predetermined burn rate at a second location along the length of the chamber spaced apart from the first location. The second predetermined burn rate is different from the first predetermined burn rate. The apparatus includes means for igniting the charge, and means for directing inflation fluid from the chamber to the inflatable device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a vehicle safety apparatus including an inflator in accordance with the present invention;

FIG. 2 is a longitudinal sectional view of the inflator of FIG. 1;

FIG. 3 is a graph which plots tank pressure against time for a tank test of the inflator of FIG. 2;

DESCRIPTION OF PREFERRED EMBODIMENTS

Figure 4:
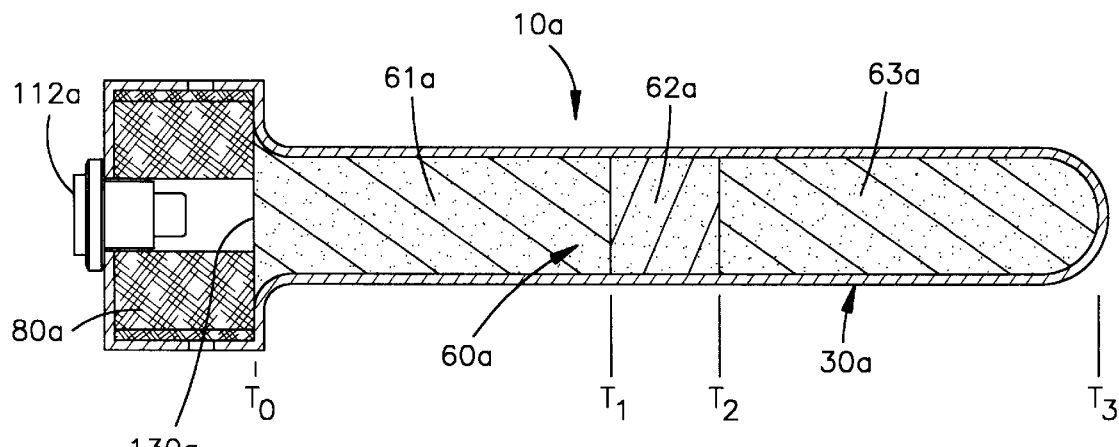
FIG. 4 is a view similar to FIG. 2 of an inflator in accordance with a second embodiment of the present invention.

The present invention relates to a vehicle safety apparatus and, in particular, to an inflator for an inflatable vehicle occupant protection device, such as an air bag. The present invention is applicable to various inflator constructions. As representative of the present invention, FIG. 1 illustrates an inflator 10 which forms a part of a vehicle safety apparatus 12.

The safety apparatus 12 includes an inflatable vehicle occupant protection device in the form of a side curtain 14. The side curtain 14 is mounted adjacent the side structure 16 of a vehicle 18, including side windows, by a support structure indicated schematically at 20. The side curtain 14 is movable upon actuation of the inflator 10 from a deflated and stowed condition (not shown) to an inflated condition as illustrated in FIG. 1, to help to protect occupants of the vehicle 18 in the event of a side impact to the vehicle.

The inflator 10 includes a housing 30 (FIG. 2) having a generally elongate configuration including a main body portion 32 and an outlet portion 34. The outlet portion 34 of the inflator housing 30 is located at a first end portion 36 of the inflator 10.

The main body portion 32 of the inflator housing 30 has a tubular, cylindrical configuration including an axially extending, cylindrical side wall 40. The side wall 40 has a cylindrical inner surface 42 centered on a longitudinal central axis 44 of the inflator 10. A second end portion 48 of the inflator 10 is closed by a domed end wall 46 of the inflator housing 30. The side wall 44 and the end wall 46 define a chamber 50 in the inflator housing 30. A pyrotechnic charge 60, described below in detail, is located in the chamber 50.

The outlet portion 34 of the inflator housing 30 has a generally cylindrical configuration including an axially extending, cylindrical side wall 70 and a planar, radially extending first end wall 72. An annular array of inflation fluid outlets 76 is formed in the side wall 70 of the outlet portion 34 of the inflator housing 30. The main body portion 32 of the inflator housing 30 flares outwardly and merges with the outlet portion 34 of the inflator housing to form a radially extending second end wall 74 of the outlet portion.

An annular first filter or slag screen 80 is disposed in the outlet portion 34 of the inflator housing 30. An annular final filter 82 is disposed radially between the first filter 80 and the side wall 70 of the outlet portion 34 of the inflator housing 30.

A diffuser 90 encloses the outlet portion 34 of the inflator housing 30. The diffuser 90 has an axially extending, cylindrical side wall 92 and a planar, radially extending end wall 94. At its end opposite the end wall 94, the diffuser side wall 92 has threads formed on its inner circumferential surface. A retainer 96 is screwed into the threaded end of the side wall 92 of the diffuser 90. The retainer 96 clamps the outlet portion 34 of the inflator housing 30 against the end wall 94 of the diffuser 90, thereby securing the inflator housing to the diffuser.

An annular diffuser chamber 100 is defined between the side wall 70 of the outlet portion 34 of the inflator housing 30, the side wall 92 of the diffuser 90, and the retainer 96. A seal 102 on the retainer 96 and a seal 104 on the diffuser end wall 94 seal the diffuser chamber 100.

The inflation fluid outlets 76 in the inflator housing 30 open into the diffuser chamber 100. The size, number, and/or configuration of the inflation fluid outlets 76 may be selected to restrict or otherwise control flow of inflation fluid into the diffuser chamber 100, in a known manner. An outlet tube 110 extends from the side wall 92 of the diffuser 90. The outlet tube 110 is connected in a known manner with the side curtain 14, as illustrated schematically in FIG. 1. An initiator 112, of a known configuration, extends from the end wall 94 of the diffuser 90 into the open center of the first filter 80.

The vehicle 18 includes known means indicated schematically at 120 (FIG. 1) for sensing a collision involving the vehicle and for actuating the inflator 10 in response to the sensing of a collision. The means 120 may include a deceleration sensor and vehicle electric circuitry for actuating the inflator 10 in response to sensing a vehicle deceleration indicative of a vehicle collision having a severity greater than a predetermined threshold value. As discussed below, the means 120 provides an electric signal over lead wires 122 to the inflator 10, when the inflator is to be actuated.

The pyrotechnic charge 60 (FIG. 2) includes a first charge portion 61 and a second charge portion 62. The first charge portion 61 has an exposed end surface 130. An opposite second end surface of the first charge portion 61 is in abutting engagement with the second charge portion 62.

Each one of the first and second charge portions 61 and 62 includes a pyrotechnic material configured to provide a predetermined burn rate. The first charge portion 61 has a relatively slow burn rate. The second charge portion 62 has a relatively fast burn rate.

The different burn rates for the first and second charge portions 61 and 62 can be achieved in a variety of ways. For example, different propellant materials or mixtures of different propellant materials can be used to provide the first and second charge portions 61 and 62 with different burn rates. Alternatively, the first and second charge portions 61 and 62 can have different fuel-oxidizer ratios, or different consolidation densities (obtained by subjecting the charge materials to different pressures during formation of the charge portions). Also, a relatively slow burn rate can be achieved in a charge portion by using larger propellant particles, and a relatively fast burn rate can be achieved in a charge portion by using smaller propellant particles.

The inflator 10 is an "end burn" type inflator. Specifically, the inflator 10 is configured so that when the pyrotechnic charge 60 is ignited at the first end portion 36 of the inflator, the charge 60 initially burns only at the exposed first end surface 130 of the first charge portion 61. The charge 60 burns with a flame front which travels axially in the chamber 50 in a direction from the first end portion 36 of the inflator toward the second end portion 48 of the inflator (from left to right as viewed in FIG. 2). No significant amount of burning occurs along the side of the charge 60, that is, along the inner side surface 42 of the side wall 40, in advance of the flame front at the axial end of the charge.

This end burn characteristic of the inflator 10 can be achieved by forming the charge 60 outside the chamber 50 so that when the charge is placed in the chamber, the charge is in intimate contact with the inner side surface 42 of the side wall 40 of the inflator housing 30. Alternatively, the charge material can be poured or packed directly into the inflator housing 30 with no clearance between the charge 60 and the inner side surface 42 of the housing side wall 40. The intimate contact between the charge 60 and the housing side wall 40, along the entire outer side surface of the charge, prevents the flame front from propagating along the side of the charge.

Because the pyrotechnic charge 60 burns with a pure end burn, the burn rate of the charge at any given location along the length of the charge is known and predictable. The material characteristics of the pyrotechnic charge 60 at a particular location along the length of the charge control the burn rate at that location. Thus, the time which a particular axial segment of the charge 60 will take to burn down can be calculated by knowing the burn rate of the material of that segment and the surface area. The output pressure of the inflator 10 can thus be tailored with respect to time.

In the particular inflator 10 illustrated in FIGS. 2 and 3, the exposed first end surface 130 of the first charge portion 61 is located adjacent to the initiator 112. In the event of an impact to the vehicle 18 of a magnitude greater than the predetermined threshold value, the sensing means 120 provides an electrical signal over the wires 122 to the inflator 10. The initiator 112 is actuated in a known manner and ignites the end surface 130 of the first charge portion 61. The first charge portion 61 thereafter burns with a flame front which travels from left to right as viewed in FIG. 2.

Inflation fluid created by ignition of the first charge portion 61 is directed through the filters 80 and 82 and through the inflation fluid outlets 76 into the diffuser chamber 100. The inflation fluid flows through the diffuser chamber 100 and out of the diffuser 90 through the output tube 110. The side curtain 14 inflates, initially, under the relatively low pressure of the inflation fluid created by burning of the relatively slow burn rate first charge portion 61.

Substantially all of the inflation fluid created by ignition of the first charge portion 61 is directed to the side curtain 14 prior to any inflation fluid created by the second charge portion 62 being directed to the side curtain. This occurs because the first charge portion 61 is located between the initiator 112 and the second charge portion 62. Thus, substantially all of the first charge portion 61 must burn before the second charge portion 62 is ignited.

When the first charge portion 61 is thus burned down, it ignites the second charge portion 62. The second charge portion 62 burns with a flame front which travels axially toward the second end portion 48 of the inflator 10. The second charge portion 62 burns at a faster rate than the first charge portion 61. As a result, the output pressure of the inflator 10 increases when the second charge portion 62 is ignited and burns.

The inflation fluid created by ignition of the second charge portion 62 is directed to the side curtain 14 through the diffuser 90 and the output tube 110. The side curtain 14 inflates further under the relatively high pressure inflation fluid created by the second charge portion 62. The side curtain 14 is preferably made from a relatively impermeable fabric. As a result, the inflation fluid directed into the side curtain 14 keeps the side curtain inflated for a substantial period of time, for example up to about five seconds.

FIG. 3 illustrates in a graphical form the results of a tank test of the inflator 10, in which the output of the inflator is directed into a non-venting test tank. The curve A in FIG. 3 graphs the tank pressure against time. The first charge portion 61 burns during the time period between $T_0$ and $T_1$ (which may be, for example, 0.5 seconds). During this time period, the pressure in the test tank rises at a first rate, as indicated by the curve segment $A_1$. When the first charge portion 61 is almost completely burned, it ignites the second charge portion 62, which burns during the time period between $T_1$ and $T_2$ (which may be, for example, 1.5 seconds). During this time period, the pressure in the test tank rises at a second rate, as indicated by the curve segment $A_2$. The second rate is greater than the first rate because of the relatively fast burn rate of the second charge portion 62. The pressure in the tank then remains substantially the same for an extended period, because the tank is closed.

Figure 5:
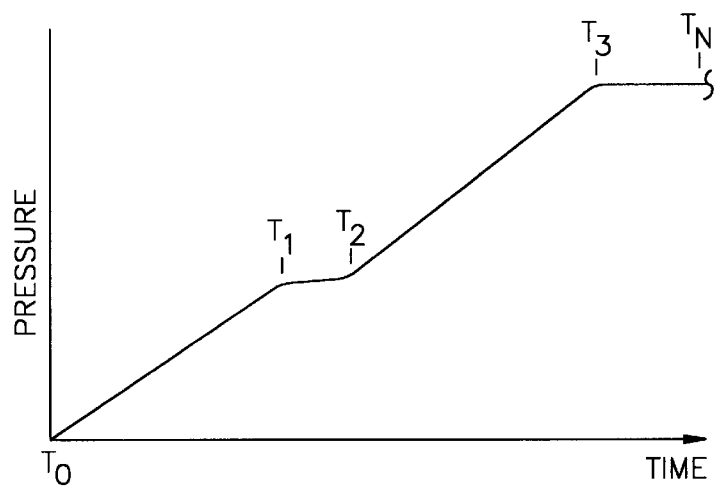
FIG. 5 is a graph which plots tank pressure against time for a tank test of the inflator of FIG. 4.

FIGS. 4 and 5 illustrate an inflator 10*a* constructed in accordance with a second embodiment of the present invention. The inflator 10*a* is identical to the inflator 10 with the exception of the constitution of the pyrotechnic charge. Parts in the inflator 10*a* which are similar or identical to the corresponding parts in the inflator 10 are given the same reference numerals with the suffix "a" added for clarity.

In the inflator 10*a*, the charge 60*a* includes three different charge portions 61*a*, 62*a*, and 63*a*. The charge portion 61*a* is ignitable first upon actuation of the initiator 112*a*. Each of the charge portions 62*a* and 63*a* is ignited subsequently, in that same order.

FIG. 5 is a graph which plots tank pressure against time for a tank test of the inflator of FIG. 4. The first charge portion 61*a* of the inflator 10*a* has a first burn rate and thus the inflator 10*a* has a first output pressure during the time period $T_0$–$T_1$. The second charge portion 62*a* has a short axial extent and a slow burn rate. Thus, the pressure in the tank rises very slowly, if at all, during the brief time period $T_1$–$T_2$. Upon completion of burning of the second charge portion 62*a*, the third charge portion 63*a* is ignited, with a burn rate similar to that of the first charge portion 61*a*. The pressure in the tank increases more rapidly again in the time period $T_2$–$T_3$.

Figure 6:
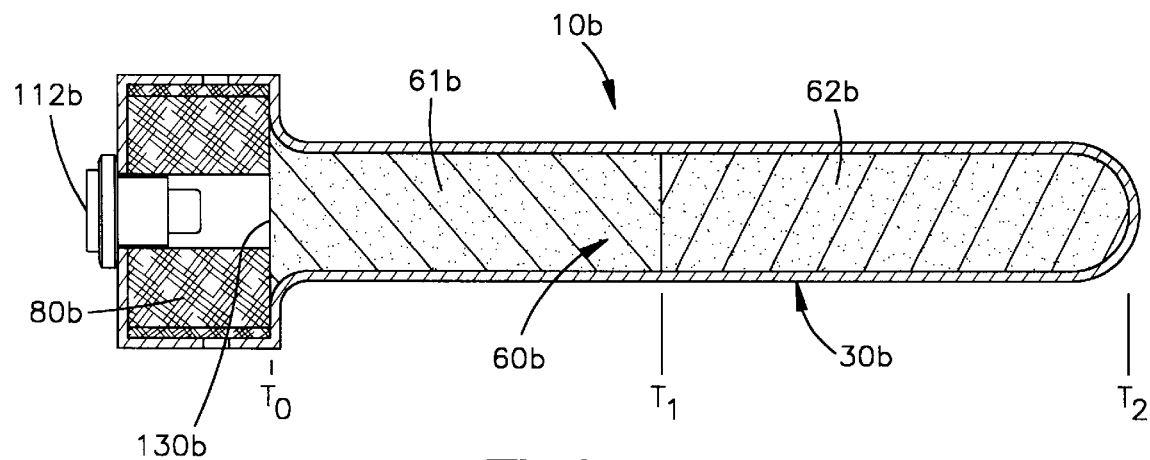
FIG. 6 is a view similar to FIG. 2 of an inflator in accordance with a third embodiment of the present invention.
Figure 7:
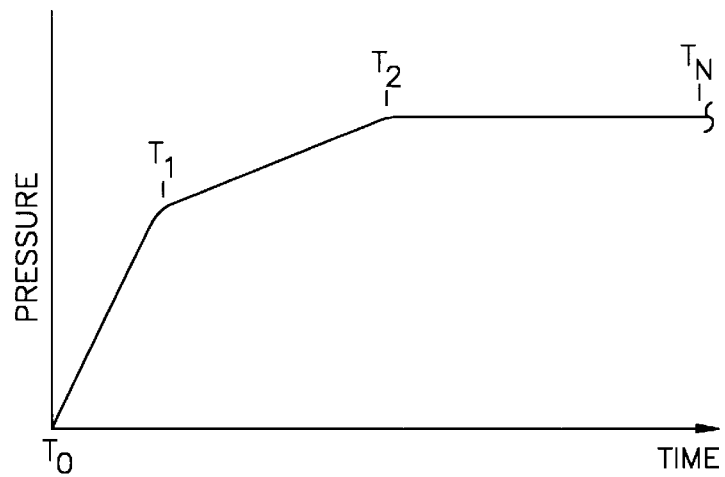
FIG. 7 is a graph which plots tank pressure against time for a tank test of the inflator of FIG. 6.

FIGS. 6 and 7 illustrate an inflator 10*b* constructed in accordance with a third embodiment of the present invention. The inflator 10*b* is identical to the inflator 10 with the exception of the constitution of the pyrotechnic charge. Parts in the inflator 10*b* which are similar or identical to the corresponding parts in the inflator 10 are given the same reference numerals with the suffix "b" added for clarity. In the inflator 10*b*, the charge 60*b* includes two different charge portions 61*b* and 62*b*. The charge portion 61*b* is ignitable first upon actuation of the initiator 112*b*.

FIG. 7 is a graph which plots tank pressure against time for a tank test of the inflator 10*b* of FIG. 6. The first charge portion 61*b* of the inflator 10*a* has a very fast burn rate and thus the inflator 10*b* has a first, relatively high, output pressure during the time period $T_0$–$T_1$. The second charge portion 62*b* has a slower burn rate than the first charge portion 61*b*. Thus, the pressure in the tank rises more slowly during the time period $T_1$–$T_2$.

The inflator 10*b* is suitable for inflating an inflatable vehicle occupant protection device in the form of a vehicle rollover protective device (not shown). Such a device preferably provides occupant protection for up to 10 seconds or more. In the inflator 10*b*, the second charge portion 62*b* burns slowly enough that it produces fluid only at a rate sufficient to compensate for pressure drop in the inflatable device over time through leakage or cooling. Thus, the fluid pressure in the rollover device can be maintained at a desired relatively constant level, allowing the device to remain filled for occupant protection for up to 10 seconds or more.

From the above description of the invention, those skilled in the art will perceive improvements, changes and modifications in the invention. For example, other combinations of burn rates can be used to provide the desired output curve for an inflator in accordance with the present invention. The length of a particular charge portion can be selected to control the output pressure over time, as illustrated with respect to the charge portion 62*a* (FIGS. 4 and 5). In addition, by putting together adjacent charge portions with different burn rates, the rate at which the inflator's burn rate changes can be controlled. Depending upon the nature of the materials used in the pyrotechnic charge, one or both of the filters shown in the illustrated embodiments of the invention could be eliminated as unnecessary. An inflator in accordance with the present invention can also be used for inflating a driver's side air bag, a passenger side air bag, or a side impact air bag which is seat mounted or door mounted. Such improvements, changes and modifications within the skill of the art are intended to be covered by the appended claims.

Having described the invention, we claim:

1. An apparatus for inflating an inflatable vehicle occupant protection device, said apparatus comprising:

a housing defining a chamber;

an end-burning pyrotechnic charge in said chamber in said housing for, upon ignition, producing inflation fluid for inflating the inflatable device;

said charge having first predetermined burn rate at a first location along a length of said chamber and a second predetermined burn rate at a second location along the length of said chamber spaced apart from the first location, the second predetermined burn rate being different from the first predetermined burn rate;

means for igniting said charge; and means for directing inflation fluid from said chamber to the inflatable device;

said housing having a tubular configuration closed at a first end by an end wall;

said means for igniting and said means for directing being located at a second end of said housing opposite said first end.

2. An apparatus as set forth in claim 1 wherein said housing has a tubular configuration including an axially extending side wall which has an inner surface in intimate contact with said pyrotechnic charge along an entire outer side surface of said pyrotechnic charge.

3. An apparatus as set forth in claim 1 wherein said pyrotechnic charge produces inflation fluid for about 10 seconds or more.

4. An apparatus for inflating an inflatable vehicle occupant protection device, said apparatus comprising:

a housing defining a chamber;

an end-burning pyrotechnic charge in said chamber in said housing for, upon ignition, producing inflation fluid for inflating the inflatable device;

said charge having a first predetermined burn rate at a first location along a length of said chamber and a second predetermined burn rate at a second location along the length of said chamber spaced apart from the first location, the second predetermined burn rate being different from the first predetermined burn rate;

means for igniting said charge; and means for directing inflation fluid from said chamber to the inflatable device;

said second predetermined burn rate being selected to be a burn rate which produces inflation fluid only at a rate sufficient to replace fluid lost through leakage from the inflatable device.

5. An apparatus for inflating an inflatable vehicle occupant protection device, said apparatus comprising:

a housing defining a chamber;

a pyrotechnic charge in said chamber in said housing for, upon ignition, producing inflation fluid for inflating the inflatable device, said pyrotechnic charge including a first portion having a relatively slow burn rate and a second portion having a relatively fast burn rate;

means for igniting said first and second charge portions, said means igniting said first charge portion prior to said second charge portion; and means for directing inflation fluid created by ignition of said first and second charge portions from said chamber to the inflatable device, inflation fluid created by ignition of said first charge portion being directed to the inflatable device prior to inflation fluid created by ignition of said second charge portion being directed to the inflatable device;

said housing having first and second end portions, said means for igniting and said means for directing being located adjacent to each other at the first end portion of said housing.

6. An apparatus as set forth in claim 5 wherein said pyrotechnic charge is an end burn pyrotechnic charge.

7. An apparatus as set forth in claim 5 wherein said means for igniting comprises a single initiator.

8. An apparatus as set forth in claim 5 wherein said first charge portion has an exposed end surface located adjacent to said means for igniting, said first charge portion when ignited burning in a direction away from said means for igniting, said first charge portion being located intermediate said means for igniting and said second charge portion, said first charge portion when substantially completely burned igniting said second charge portion.

9. An apparatus as set forth in claim 5 wherein substantially all the inflation fluid created by ignition of said first charge portion is directed to the inflatable device prior to inflation fluid created by ignition of said second charge portion being directed to the inflatable device.

10. An apparatus as set forth in claim 5 wherein said first and second charge portions have different propellant materials or mixtures of different propellant materials.

11. An apparatus as set forth in claim 5 wherein said first and second charge portions have different fuel-oxidizer ratios.

12. An apparatus as set forth in claim 5 wherein said first and second charge portions have different consolidation densities.

13. An apparatus as set forth in claim 5 wherein said first and second charge portions have different size propellant particles.

* * * * *